United States Patent
Hunt et al.

[19]

[11] Patent Number: 6,151,300
[45] Date of Patent: Nov. 21, 2000

[54] METHOD AND APPARATUS FOR ENABLING FLOW CONTROL OVER MULTIPLE NETWORKS HAVING DISPARATE FLOW CONTROL CAPABILITY

[75] Inventors: Douglas H. Hunt, Sudbury; Raj Krishnan Nair, Acton; Andrew G. Malis, Andover, all of Mass.

[73] Assignees: Fujitsu Network Communications, Inc., Richardson, Tex.; Fujitsu Limited, Kawasaki, Japan

[21] Appl. No.: 08/854,231

[22] Filed: May 9, 1997

Related U.S. Application Data

[60] Provisional application No. 60/017,504, May 10, 1996, and provisional application No. 60/019,701, Jun. 20, 1996.

[51] Int. Cl.[7] ............................ G01R 31/08; G06F 11/00; G08C 15/00
[52] U.S. Cl. ........................... 370/231; 370/236; 370/469
[58] Field of Search ..................................... 370/235, 236, 370/230, 231, 469

[56] References Cited

U.S. PATENT DOCUMENTS

| | | | |
|---|---|---|---|
| 5,313,454 | 5/1994 | Bustini et al. | 370/235 |
| 5,493,566 | 2/1996 | Ljungberg et al. | 370/231 |
| 5,515,359 | 5/1996 | Zheng | 370/231 |
| 5,528,591 | 6/1996 | Lauer | 370/235 |
| 5,583,865 | 12/1996 | Esaki et al. | 370/469 |
| 5,600,798 | 2/1997 | Cherukuri et al. | 370/230 |
| 5,787,071 | 7/1998 | Basso et al. | 370/231 |
| 5,852,601 | 12/1998 | Newman et al. | 370/236 |
| 5,889,761 | 3/1999 | Yamato | 370/231 |

*Primary Examiner*—Chau Nguyen
*Assistant Examiner*—Phuongchau Ba Nguyen
*Attorney, Agent, or Firm*—Weingarten, Schurgin, Gagnebin & Hayes LLP

[57] ABSTRACT

Method and apparatus for extending lower-layer flow control end-to-end, transparent to network host systems, between network hosts attached to legacy networks without requiring any changes to the host networks or hosts themselves. In a first embodiment, a source host and a destination host, each residing on a respective LAN, communicate via an intermediate network supporting the lower-layer flow control. A higher-layer, end-to-end flow control protocol exists between the hosts. The lower-layer flow control protocol accounts for loss of bandwidth between each hop within the intermediate network. To extend the lower-layer flow control protocol to the hosts, an intelligent edge device of the intermediate network adjusts observed higher-layer flow control parameters based upon the state of the lower-layer flow control. No modifications to the legacy network or hosts is required, and the extension of flow control is transparent to the legacy networks.

57 Claims, 3 Drawing Sheets

METHOD AND APPARATUS FOR ENABLING FLOW CONTROL OVER MULTIPLE NETWORKS HAVING DISPARATE FLOW CONTROL CAPABILITY

CROSS REFERENCE TO RELATED APPLICATIONS

This application claims the benefit of U.S. Provisional Application Ser. No. 60/017,504, filed May 10, 1996, and U.S. Provisional Application Ser. No. 60/019,701, filed Jun. 20, 1996.

STATEMENT REGARDING FEDERALLY SPONSORED RESEARCH OR DEVELOPMENT

Not Applicable

BACKGROUND OF THE INVENTION

The invention generally relates to the field of computer networks, and specifically to extending lower-layer flow control end-to-end between network hosts attached to legacy networks not otherwise supporting such flow control.

Transmission Control Protocol (TCP) is the standard transport protocol used with the Internet Protocol (IP), which is both the dominant data communications protocol on LANs and the basic protocol used to build the worldwide Internet. TCP is a connection-oriented, end-to-end reliable protocol designed to fit into a layered hierarchy of protocols which support multi-network applications. TCP provides reliable inter-process communication between pairs of processes in host computers attached to either the same or distinct but interconnected computer communications networks. TCP assumes it can obtain a simple, potentially unreliable datagram service from lower level protocols. Further, TCP is capable of operating above a wide spectrum of communications systems ranging from hard-wired connections to packet-switched or circuit-switched networks.

Quantum Flow Control (QFC) is a cell-relay protocol characterized by quantized buffer state feedback. QFC supports an Asynchronous Transfer Mode (ATM) Available Bit Rate (ABR) cell service that is distinguished for its ability to support instantaneous access to unused and therefore available network bandwidth with cell loss rates no greater than link error rates. The ABR service is designed for bursty applications where the application's bandwidth requirements are difficult to predict in advance. The service uses the QFC protocol to provide a feedback mechanism that controls the source rate to ensure zero cell loss regardless of network congestion. QFC is a hop-by-hop protocol that uses buffer state accounting to ensure that each hop along a data path cannot send more data to the next hop than it has room to buffer, thus preventing overflow and data loss.

One example of a QFC implementation providing link level flow control is found in U.S. patent application Ser. No. 08/847,658, now issued as U.S. Pat. No. 5,781,533, which is incorporated herein by reference.

TCP and IP are "layered over," or carried by, link layer networks. Such link layer networks have traditionally been LANs such as Ethernet or FDDI, WANs such as X.25 or Frame Relay, and IP networks made up of serial lines between routers. TCP/IP traffic is sent in packets that can be many hundreds or thousands of octets in length. If a packet is dropped by a network due to congestion or a transmission collision, TCP detects the loss and retransmits the packet following a timeout. Higher layer flow control protocols such as TCP impose end-to-end flow control to ensure that the receiver is not overrun by the sender, and take steps to attempt to prevent network congestion along the traffic path.

Though the mechanisms differ in details, both TCP and QFC incorporate flow control, using buffer availability information to provide a reliable service.

There has been considerable effort directed towards developing the use of ATM as a link layer network to carry TCP/IP traffic. Each TCP/IP packet must be split into a train of ATM cells at the source, and reassembled back into a packet at the destination. The loss of a single cell results in the required retransmission of a complete packet, which may be tens or hundreds of cells in length. If cells are randomly lost due to congestion at the ATM layer, the resulting required packet retransmissions could be at best a very inefficient use of the ATM network, and at worst could result in complete congestive collapse of the network.

Figure 1:
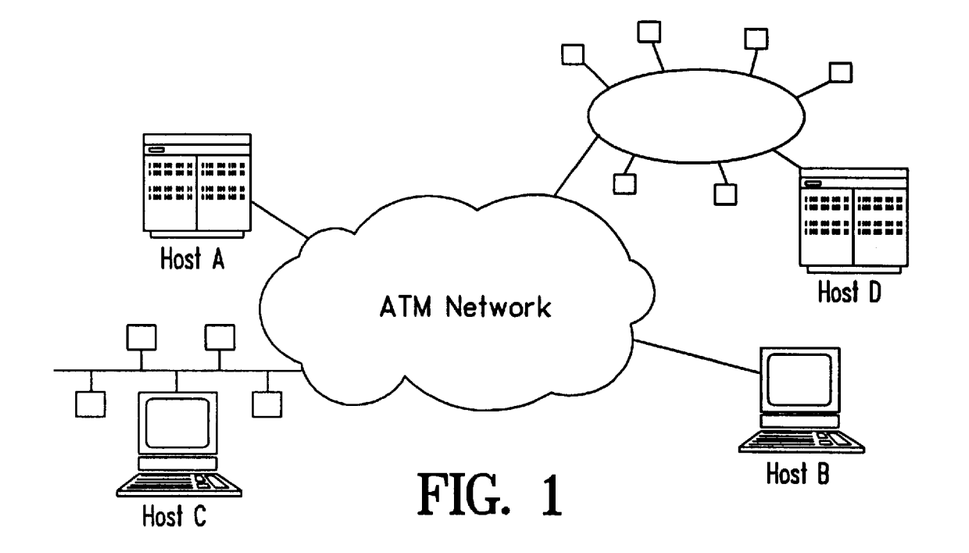
FIG. 1 illustrates various hosts configured with respect to an ATM network incorporating a reliable flow control protocol.

When TCP/IP traffic sources and destinations are directly connected to an ATM network such as the case between Hosts A and B in FIG. 1, flow control, such as provided by QFC, ensures that sources can transmit no faster than the rate at which both the destination host and the network are able to accept the stream of traffic. The same holds true for any reliable flow control protocol at the ATM layer. However, it is desirable to extend the benefits of ATM layer flow control to source and destination hosts which are connected to distinct LANs (or extended LANs), each of which in turn is connected to an ATM network, without requiring any changes to the networks supporting the hosts (the host networks) or hosts themselves and in a manner transparent to host networks.

BRIEF SUMMARY OF THE INVENTION

The present invention provides the ability to extend lower-layer flow control end-to-end between host systems attached to networks not otherwise supporting such flow control, without requiring any changes to the host networks or hosts themselves. In a first embodiment, the present invention extends ATM network flow control to hosts on LANs communicating over an ATM network(s). These LANs are referred to generically as legacy networks, though "legacy" is not meant to imply only those networks which are currently known to exist, such as XDSL and Ethernet, including Gigabit Ethernet. In fact, the present invention is applicable to any network or networks which support higher layer, end-to-end flow control.

In one embodiment, the present invention enables the use of ATM as a link layer network to carry TCP/IP traffic. As previously noted, higher layer flow control protocols, such as TCP, offer end-to-end closed loop flow control. When used together with a lower layer flow control, there are two autonomous closed loop flow control protocols, one at the transport layer and another at the ATM layer, operating at the same time on the same traffic stream. Independent operation of the two layers may result in a situation where the lower layer protocol throttles back the flow, while the higher layer protocol might ramp up leading to excessive packet loss and unstable behavior. Such independent, multiple layered control loops are referred to as being uncoordinated due to the absence of any control information transfer from the lower to the higher layer.

Examples of other higher-layer protocols to which the present invention has applicability include DecNet and Burst Mode IPX; these are merely representative of the range of suitable protocols which presently exist, and exemplify the type of protocol to which the present invention is applicable and which may be later developed.

The present invention utilizes coordinated, multiple layered control loops. FIG. 1 also illustrates the situation where Host C represents the source host and Host D represents the destination host, each being directly connected to a LAN which is in turn connected via a router, bridge, Ethernet switch, cell switched router, or other legacy internetworking device to a device with an ATM network interface and preferably supporting QFC. Such switches are termed "ATM-attached edge devices." In the prior art, ATM layer flow control is only in effect between the ATM switches at the boundaries of the ATM network, while TCP flow control is in effect end-to-end. While TCP prevents the destination host from being overrun by the source host, uncoordinated flow control at the ATM layer is unable to prevent the ATM network from being overrun by the source host. As a result, packets may be lost at the ATM switch closest to Host C, requiring Host C to timeout and retransmit the packets.

The present invention addresses this situation in a first embodiment by providing ATM layer flow control to Host C in a way that is transparent to Host C and the network to which it is attached. This is done by coupling ATM layer feedback information to TCP's window advertisements, which are carried in the TCP header, using an approach referred to as "Instream Window Management" (IWM). Through the coupling with TCP, the link layer flow control feedback is conveyed transparent to the network hosts; no changes are required in the legacy networks or hosts.

Higher layer window advertisements are observable at the ATM-attached edge device. Consequently, it is possible to utilize the IWM process to provide the coordination required between the lower and higher layer flow controls. ATM-layer edge devices are thus provided with explicit control over transport-layer windows. Host D sends back window advertisements piggybacked on the TCP headers to the source, Host C. The ATM switch closest to the LAN of Host D, also referred to as the Egress Intelligent Edge Device or "Egress IED," uses a right edge of the window advertised by Host D as an indication of how many bytes Host D can accept at a given time. The Egress IED thus uses that information to ensure that it does not forward more than that number of bytes to Host D. As a result, the window right edge limit is reflected in the QFC "forward counter" value that the Egress IED provides to its upstream neighbors. The Egress IED as well as all other ATM network elements along the connection avoid cell loss in the direction of Host D.

Figure 3:
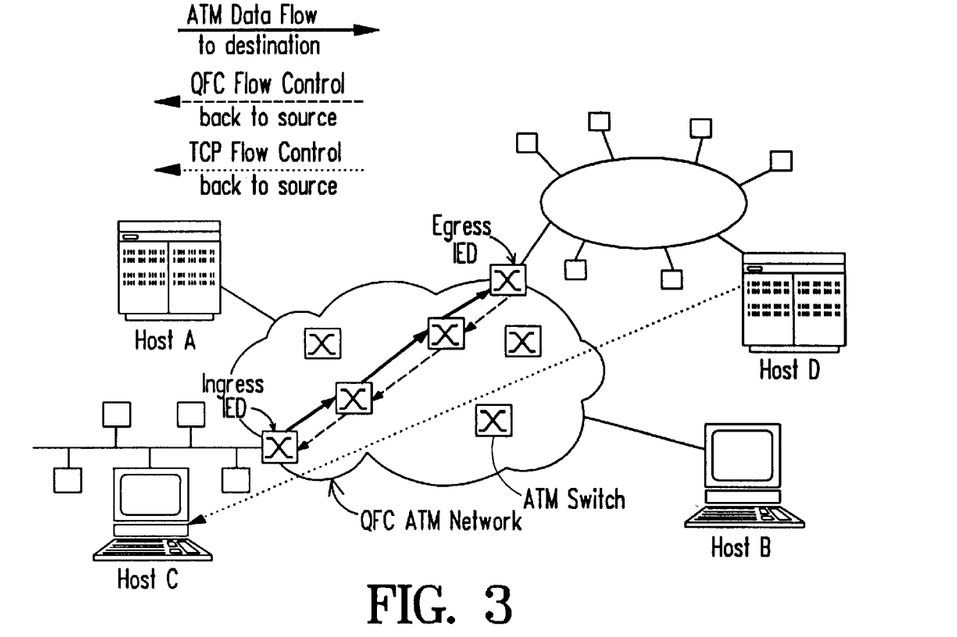
FIG. 3 illustrates data and flow control paths between two hosts indirectly connected to a QFC ATM network.

In the case where the source host is directly connected to the LAN, such as Host C in FIG. 3, an Ingress Intelligent Edge Device or "Ingress IED" can ensure that the LAN cannot overflow that IED's LAN-side input buffers. This is accomplished by the Ingress IED examining the acknowledgment number and the window in the TCP header from the destination host, Host D, and by further constraining the TCP advertised window information seen by the source host, Host C, if required. The modified value of the window, passed further upstream to the data source, is referred to as the "Ingress Window."

The Ingress IED may also need to generate TCP headers on its own, even in the absence of a TCP header arriving from the destination host. This is necessary when the Ingress IED begins to have more space available on its LAN-side input buffer pool, and thus needs to inform the source host of this status. These locally-generated TCP headers appear to the source host as TCP headers with zero-length segments. TCP headers from the destination host passing through the Ingress IED are referred to as Modified Acknowledgments or "Modified ACKs" while those locally generated by the Ingress IED are referred to as Generated Acknowledgments or "Generated ACKs." The Modified ACKs and the Generated ACKs are utilized by the Ingress IED to ensure that the Ingress Window values provided to the source host are consistent with the last Ingress Window value supplied and the actual value of the window as provided by the destination host. Thus, the flow control enabled by the ATM network is extended both through the Egress IED to the destination host and through the Ingress IED to the source host.

BRIEF DESCRIPTION OF THE SEVERAL VIEWS OF THE DRAWING

The invention will be more fully understood by reference to the following description in conjunction with the accompanying drawings of which.

DETAILED DESCRIPTION OF THE INVENTION

The key to the coordination of layered control loops, as provided by the present invention, lies in the fact that higher layer flow control windows are observable, and therefore manipulatable, at a lower-layer edge device. In light of this, the present invention provides "Instream Window Management" (IWM) to provide coordination between the lower (e.g. Asynchronous Transfer Mode or ATM) and higher (e.g. Transmission Control Protocol/Internet Protocol or TCP/IP) layer protocols. U.S. Provisional Patent Applications Ser. Nos. 60/017,504 and 60/019,701 are incorporated herein by reference for the purpose of further illustrating the subject matter of the present invention.

IWM, as described subsequently, provides a number of benefits with respect to coordinated flow control. For instance, the present invention avoids deadlocks between the higher and lower layers. IWM dynamically modifies the transport-layer (i.e. TCP/IP layer) window based upon flow control feedback and input buffer availability at the lower layer. IWM is transparent from the point of view of the higher layer flow control. IWM does not require one-to-one mapping of transport-layer flows to lower-layer connections, thus avoiding problems when multiplexing multiple flows on a single stream. The input buffer in an ATM-attached edge device is shared in the present invention among all independent transport-layer flows arriving from the various sources on the attached LAN, and IWM uses the combination of buffer availability and lower layer flow control feedback to manage the transport-layer windows and prevent input buffer overflow. To the extent higher and lower layer multicast mechanisms and connections are in use, IWM includes them in the coordination process to avoid contention between unicast and multicast traffic for available resources. Finally, IWM works seamlessly with existing legacy devices; no change in LAN hosts are required, and no requirements or operational details of the existing lower-layer and transport-layer flow control are violated.

Higher-layer flow control protocols (e.g. TCP) are typically window-based, employing a receiver-advertised window to limit the number of bytes transmitted from a source (or source host) to the receiver (or destination host). The source host must stop transmitting once it has exhausted the window of data which was conveyed to it by the destination host until a subsequent window provides an indication from the destination that more data can be transmitted. The size of the window is typically determined, at least in part, by the Round Trip Bandwidth Product (RTBP), which represents the round trip time between the hosts in question multiplied by the bandwidth of the connection. If this number is high, more data can be sent between windows, though any loss will likely require retransmission of a significant quantity of data. Thus, the goodput (i.e. the efficiency of retransmission avoidance) of the transmission protocol suffers.

To achieve coherence of data grouped into packets, lower-layer flow control functions must be coordinated with the higher-layer flow control functions. Specifically, the higher-layer feedback must be correlated to the feedback mechanism in the lower-layer. In a preferred embodiment, the lower-layer is an ATM network providing Quantum Flow Control ("QFC") as described in U.S. patent application Ser. No. 08/847,658, now U.S. Pat. No. 5,781,533, which is assigned to the Assignee of the instant patent application and incorporated herein by reference. The following discussion refers to the preferred embodiment which utilizes an ATM network or networks as the lower-layer, though the present invention is applicable to any network supporting a lower layer flow control protocol which provides intra-network flow control. The best overall service is provided by the present invention if the lower layer protocol guarantees a reliable, i.e. low loss, service.

Flows from the legacy network to the ATM network are switched after identification by an ATM edge device, the Ingress Input/Output Module (IOM). Within the ATM network, there is in general no knowledge of frame structure. Therefore, the coordination of the control functions between higher and lower layers must occur in an edge device that can take buffer capacity and lower layer flow control into account, and that has knowledge of frame structure. In particular, the coordination must take place at the ATM-attached edge device in the direction towards the source legacy network. Such a coordinating ATM-attached edge device is herein referred to as an Intelligent Edge Device (IED). The IED can be an Ingress IED, because data flowing into the ATM network enters the network at this point, or can be an Egress IED because data exiting the ATM network does so at this point. The nomenclature "Ingress" and "Egress" is relative to the direction of data flow; depending upon the data flow considered, such an edge device can be both and Ingress IED and an Egress IED.

Figure 5:
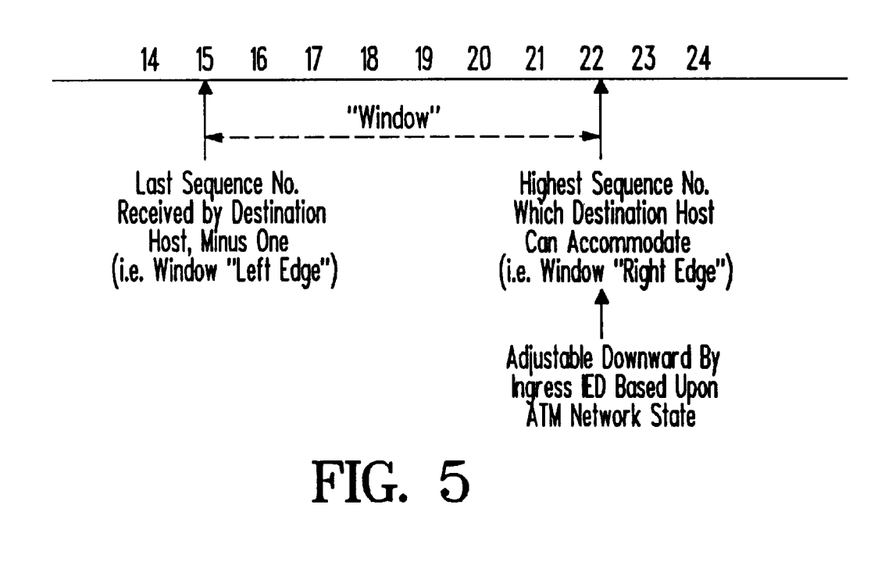
FIG. 5 is an illustration of information provided in a TCP window advertisement.

TCP window-based flow control employs flow control segments, each containing an acknowledgment number and a window, collectively referred to as an acknowledgment or "ACK." Each octet transmitted via TCP in the forward direction is assigned a sequence number. The TCP destination host checks for corruption or non-delivery of data that may have occurred in the transmission process. If the data are acceptable, the destination host generates an ACK for delivery to the source host in which the acknowledgment number acknowledges all octets up to and including the acknowledgment number less one. As illustrated in FIG. 5, the window in the ACK indicates the number of additional bytes that the transmitter may send without resulting in buffer overrun at the destination host.

Figure 2:
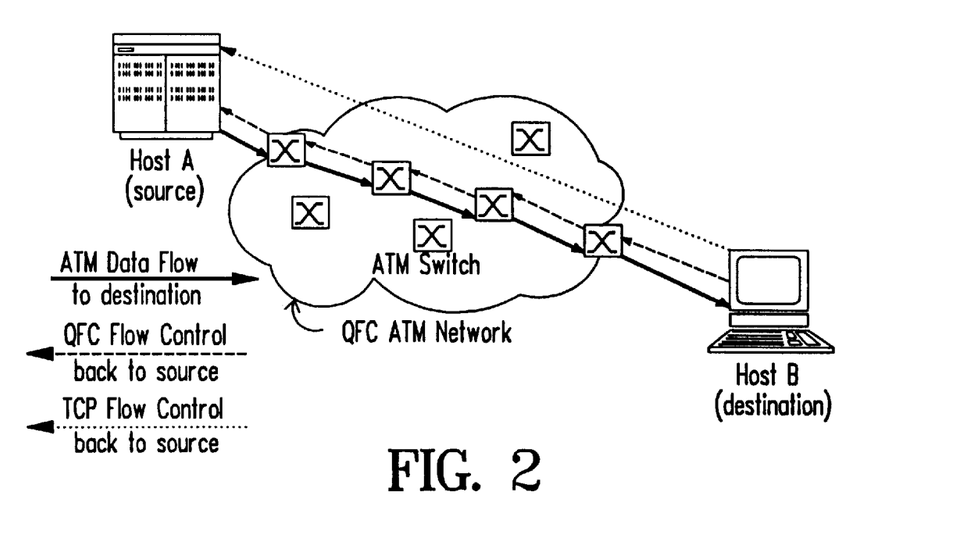
FIG. 2 illustrates data and flow control paths between two hosts directly connected to a QFC ATM network.

At the lower layer, "Quantum Flow Control" (QFC) enables the ATM network to guarantee zero cell loss within the ATM network regardless of the degree of congestion, thus providing high network utilization and efficiency. When TCP/IP traffic sources and destinations are directly connected to such an ATM network, such as Hosts A and B in FIG. 1 or 3, the ATM network flow control protocol ensures that the source host cannot transmit faster than both the destination host and the intermediate network are capable of accepting data. While in a preferred embodiment this protocol is QFC, alternative embodiments may employ any reliable lower layer flow control protocol. In FIG. 2, Hosts A and B are direct-attached hosts to ATM switches, thereby supporting a Reliable Low Loss (RLL) service end-to-end.

However, if either, or both, of the source and destination hosts are LAN-attached to the ATM network, including via extended LANs, each of the LANs must interface the ATM network through an IED. This is the case for Hosts C and D in FIG. 3. Such IED interfaces enable the extension of the benefits of the reliable lower layer flow control protocol to hosts which are not directly attached to the ATM network.

FIG. 3 illustrates the ATM switches along the data path between Hosts C and D, and indicates the QFC flow control at the ATM layer, and the end-to-end TCP flow control at the transport layer, the flow control data flowing in the direction opposite of data flow. Though not illustrated, for purposes of simplicity, there is flow control in both directions in the case of data flowing in both directions.

Without the Ingress and Egress IEDs illustrated in FIG. 3, QFC flow control is only in effect between the ATM edge devices. Therefore, while TCP prevents the destination host from being overrun by the source host, TCP alone is unable to prevent the intermediate ATM network from being overrun by the source host. As a result, packets may be lost at the ATM switch closest to Host C, necessitating the retransmission, and possibly multiple retransmissions, by Host C of the lost packets. To address the situation, the present invention enables the extension of QFC flow control data back to the source host via the Ingress and Egress IEDs.

This is accomplished by coupling the QFC feedback information to the window advertisements of TCP, which are carried in the TCP header. Again, for the purposes of simplicity, the present description assumes one TCP connection mapped to the underlying ATM connection. However, the present invention can also apply to the case of multiple TCP connections per ATM connection. Further, each of the Ingress IED and Egress IED are capable of functioning as the opposite edge device when data flows in the reverse direction.

For purposes of illustration, consider a unidirectional data path originating at Host C and terminating at Host D, as shown in FIG. 3. TCP enables Host D to send window advertisements back to Host C. From the point of view of the Egress IED in communication with Host D, the Egress IED is given an indication of how many bytes Host D can accept at the present moment from the ATM connection carrying the TCP connection, based upon the right edge of the window in the window advertisement (FIG. 5). The Egress IED uses that information to ensure that it does not forward more than the advertised number of bytes to Host D. As a result, the window right edge limit is reflected in the QFC protocol buffer state that the Egress IED provides to its upstream ATM switch neighbors. Thus, the Egress IED, as well as all of other QFC elements (e.g. ATM switches) along the presently considered connection, avoid cell loss at destination Host D.

Figure 4:
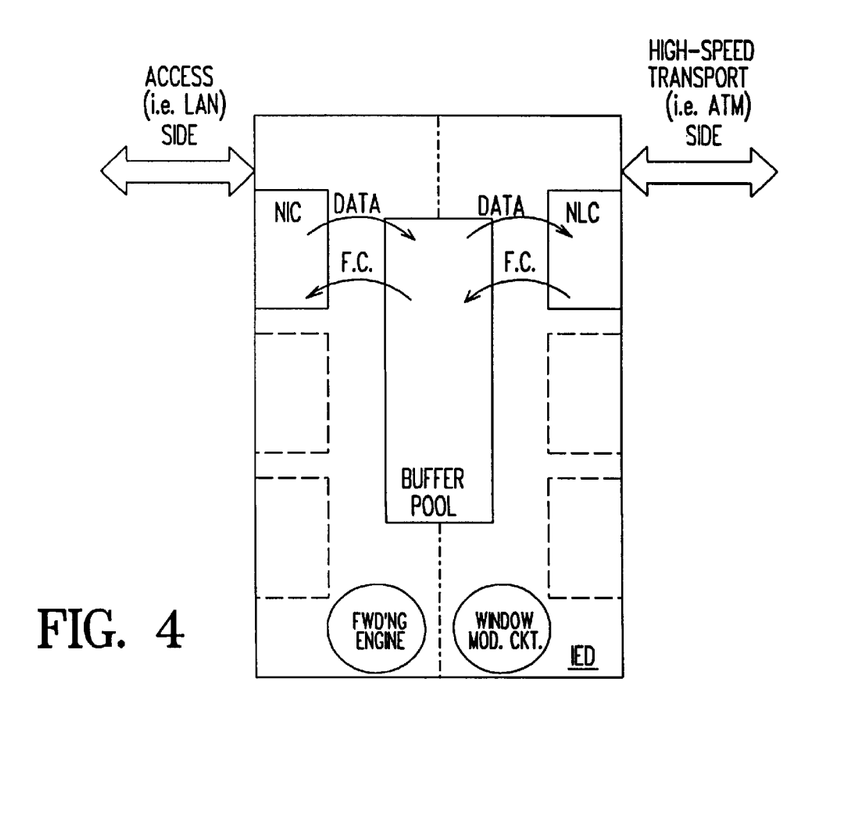
FIG. 4 represents an Intelligent Edge Device or "IED" according to the present invention.

Now consider the unidirectional data path emanating from source Host C, as in FIG. 3, and the respective Ingress IED, as in FIG. 4. From the point of view of the Ingress IED communicating with Host C via a Network Interface Card (NIC), the Ingress IED cannot allow Host C to overflow the LAN-side input buffers of the Ingress IED. This is accomplished by constraining the TCP window advertisement information which was originated by destination Host D. The Ingress IED, using window modification circuitry (Window Mod. Ckt.) associated with the buffer pool, effectively creates a logical "local window" which tracks available frame buffer space on the LAN-side input buffer pool of the Ingress IED. Based upon this capacity and the TCP window available to Host C, communicated by Host D, the Ingress IED selectively modifies the TCP window advertisements prior to forwarding them to the source host. For example, if the TCP indicated another 1000 bytes of data could be sent on a connection, but the local window of the Ingress IED can support 500 bytes for that connection, Host C will see an advertised TCP window of 500 bytes. As the local buffer space in the Ingress IED becomes available, TCP window advertisements modified by the Ingress IED will be increased until they eventually match the advertisements originated by the destination host.

Also illustrated in FIG. 4 are buffers within the buffer pool for handling flow control (F.C.) flowing in the direction reverse to that of the data flow, and Network Line Cards (NLCs) which provide a physical interface to the high-speed transport network, which in the preferred embodiment is an ATM network. The advancement of data through the IED in the forward direction is under the control of a forwarding engine.

The IWM approach is optimized when the LAN of the source host is directly attached to the Ingress IED and similarly when the destination host LAN is directly attached to the Egress IED. However, this approach also functions if either host is attached to an extended LAN, though the possibility of packet loss may then exist in the intermediate bridges and routers connecting the LAN segments.

Whenever a TCP ACK from the destination host to the source host, which has the form ACK(last_seen_seq, window), passes through the Ingress IED, the Ingress IED records the values of both the acknowledgment number (last_seen_seq, which is the window left edge) and the value of the window in the ACK (the difference between the window edges), and may then modify this window value downward. The window value passed further upstream to the source host is referred to as "Ingress Window." In order to maximize the rate of operation of the IED, the preferred embodiment of the present invention utilizes a hardware implementation of the functions necessary to observe the TCP windows, to modify them as required, and to generate acknowledgments as necessary. For instance, registers are provided for all recorded data values relating to the TCP window advertisements. The logic required for parsing the TCP flow control information and for constructing the appropriate acknowledgments is implemented in one or more Application Specific ICs (ASICs).

If lower-layer flow control alters the flow or content of higher-layer acknowledgments then when the lower layer is ready to allow additional traffic, the higher layer may still be unable to transmit. For TCP as the higher layer, a timeout will eventually resolve the deadlock, but other higher-layer transport protocols may not provide this facility.

To resolve this problem, a first embodiment of the present invention employs the autonomous generation of transport-layer acknowledgments when the lower-layer is ready to accept more traffic. Thus, the Ingress IED may need to generate ACKs on its own, even in the absence of an ACK arriving from the destination host. This addresses the situation where the Ingress IED acquires more available space in its LAN-side input buffer pool, and needs to communicate this to the source host. The connection can make forward progress without relying upon the destination-generated ACKs which are generated only when destination host actually observes more TCP segments on the connection. These locally-generated ACKs appear to the source host as TCP headers with zero-length segments. Such Ingress IED-generated acknowledgments are referred to as "generated ACKs," while those produced by the destination host and modified by the Ingress IED are referred to as "modified ACKs."

When the first ACK of a data flow passes through the Ingress IED, that IED may modify the Ingress Window value such that the window value provided to the source host is $$0 <= \text{Ingress\_Window} <= \text{TCP\_Window}$$

A smaller Ingress Window value represents a restraint on the buffer space available to this data flow within the Ingress IED. On subsequent ACKs of the same data flow, the Ingress IED may again modify the window value returned to the source host. The acknowledgment number may have advanced since the last window was provided, by a value k>=0. The Ingress IED may modify the window value from the destination host to be the Ingress Window value such that $$\text{Last\_Ingress\_Window} - k <= \text{Ingress\_Window} <= \text{TCP\_Window}$$

The Ingress IED maintains the "Last_Ingress_Window" as well as the last acknowledgment number and last TCP_Window for each connection. The Ingress IED may determine k by subtracting the value of the last acknowledgment number from the current acknowledgment number.

The Ingress IED can actually reduce the value of the Ingress Window by k from one ACK to the next, as long as the acknowledgment number itself has increased by k. This keeps the right edge of the ACK window non-decreasing. At the other extreme to this example, the Ingress IED may not restrict the window at all, thus providing the source host with the same window that was generated by the destination host.

In the case of generated ACKs, triggered as appropriate as local buffers in the Ingress IED are made available, the Ingress IED creates an ACK that uses the value of the last acknowledgment number as the current acknowledgment number. For the window value, the Ingress IED provides a new Ingress Window value such that $$\text{Last\_Ingress\_Window} <= \text{Ingress\_Window} <= \text{Last\_TCP\_Window}$$

Generated ACKs, which have the same acknowledgment number as the previous ACK, may appear to the source host as duplicate ACKs which could trigger a fast retransmission by the source host. However, such a retransmission need not consume network resources since the Ingress IED is able to determine that the segment being retransmitted was already delivered to the destination host, was the result of a duplicate ACK, and the retransmission can be intelligently dropped and acknowledged by the Ingress IED.

With regard to the Egress IED, whenever a TCP ACK from the destination host to the source host passes through the Egress IED, the Egress IED reads the acknowledgment number and window in the ACK and restricts the buffer usage of the data flow at the Egress IED to be consistent with the right edge of the window from the destination host. This restriction on buffer usage propagates backwards through the ATM network via QFC.

The Egress IED keeps track of the number of bytes F forwarded to the destination host on a per-connection basis. To guarantee no cell loss, the Egress IED must restrict buffer usage until the next ACK such that F is no more than the current right edge of the destination host window.

Figure 6:
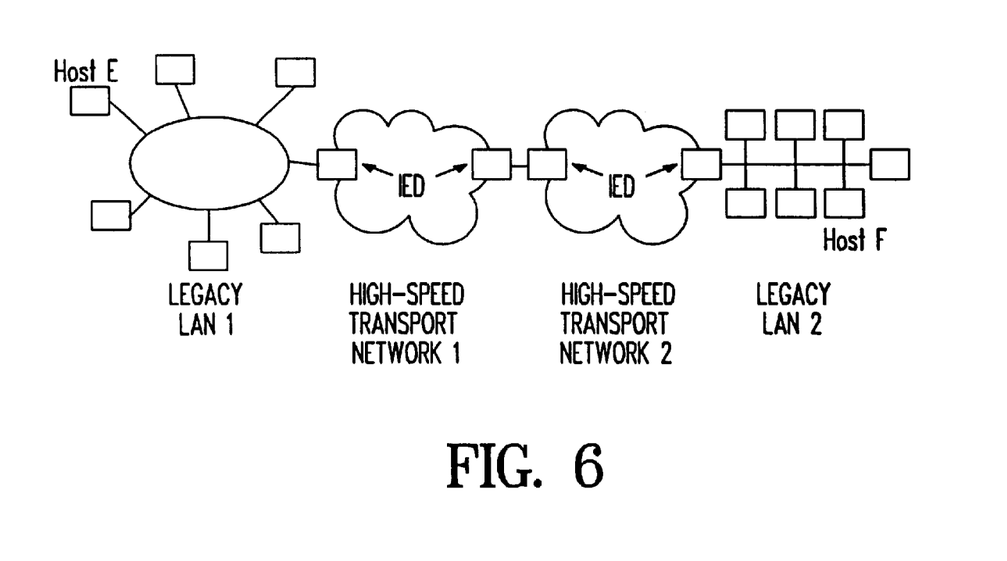
FIG. 6 illustrates a further embodiment of the present invention.

As previously noted, the present invention is applicable to a variety of network arrangements between a pair of hosts, each providing some form of end-to-end flow control at an upper layer and a lower layer, intra-network flow control within at least one network intermediate the hosts. For instance, in FIG. 6, two high-speed networks, Networks 1 and 2, are shown intermediate Hosts E and F. Here, rather than providing modified and generated ACKs directly to the source host, the Ingress IED of Network 2 provides such information to the Egress IED of Network 1. Otherwise, each of the high-speed Networks 1 and 2 perform as the prototypical ATM network described above with respect to observing, utilizing and modifying higher-layer flow control information passed between Hosts E and F. As before, no modifications are necessary to the communicating hosts, Hosts E and F, or to the networks upon which they reside, identified as Legacy LAN 1 and Legacy LAN 2. To reiterate, "legacy" is used here to identify networks supporting a higher layer, end-to-end flow control protocol, known or yet to be developed.

These and other examples of the invention illustrated above are intended by way of example and the actual scope of the invention is to be limited solely by the scope and spirit of the following claims.

What is claimed is:

1. A method of extending lower layer flow control of an intermediate network to host networks supporting higher layer flow control and interconnected through said intermediate network, said method comprising:

interpreting higher layer flow control information from one of said host networks;

establishing a lower layer flow control status of said intermediate network, said intermediate network supporting a lower layer flow control protocol, and wherein said flow control status of said intermediate network is based on said lower layer flow control protocol;

modifying said higher layer flow control information, at least in part, based on said interpreting of said higher layer flow control information and said lower layer flow control status of said intermediate network; and forwarding said modified higher layer flow control information to another of said host networks.

2. The method of claim 1, wherein said interpreting, establishing, modifying and forwarding are accomplished by a device within said intermediate network.

3. The method of claim 1, wherein said interpreting further comprises storing data from said higher layer flow control information in registers within said intermediate network and comparing said stored data against previously stored higher layer flow control data.

4. The method of claim 1, wherein said interpreting further comprises receiving said higher layer flow control information at a first edge device of said intermediate network, forwarding said higher layer flow control information between consecutive elements within said intermediate network, and interpreting said higher layer flow control information within a second edge device of said intermediate network.

5. The method of claim 1 wherein said establishing further comprises identifying the status of a Quantum Flow Control process within said intermediate network.

6. The method of claim 1 wherein said forwarding further comprises calculating a capacity of said intermediate network based upon said higher layer flow control information and said intermediate network flow control status and selectively modifying said higher layer flow control information based upon said calculation prior to forwarding said modified higher layer flow control information.

7. The method of claim 1 wherein said forwarding further comprises forwarding unmodified higher layer flow control information.

8. The method of claim 1 further comprising:

generating higher layer flow control information based upon said interpreted higher layer flow control information, said intermediate network lower layer flow control status, and previously modified higher layer flow control information; and forwarding said generated higher layer flow control information to said another of said host networks.

9. A method of extending a lower layer flow control protocol from an intermediate network to host networks interfacing to said intermediate network, wherein said intermediate network supports said lower layer flow control protocol and said host networks interfacing to said intermediate network support a transport layer flow control, said method comprising:

receiving a transport layer flow control message at a first element of said intermediate network from one of said host networks;

propagating said received transport layer flow control message through said intermediate network to a second element;

selectively modifying said received transport layer flow control message based upon intermediate network lower layer flow control information; and forwarding said modified transport layer flow control message to another of said host networks.

10. The method of claim 9 wherein said receiving further comprises receiving, at a first intermediate network edge device, a TCP/IP acknowledgment from a destination host accessible on said one of said host networks.

11. The method of claim 9 wherein said propagating further comprises passing said received flow control message between intermediate network nodes in a direction opposite a respective flow of data between said one and another host networks.

12. The method of claim 9 wherein said propagating further comprises passing said received flow control message from a first element of an intermediate ATM network supporting Quantum Flow Control to other such elements in a direction opposite a respective flow of data through said intermediate ATM network.

13. The method of claim 9 wherein said selectively modifying further comprises:

parsing said received flow control message at a second element of said intermediate network;

comparing said parsed flow control message to a previously parsed and stored flow control message;

identifying a capacity of said intermediate network based upon said intermediate network lower layer flow control information; and selectively modifying said received flow control message based upon said comparison and said identification.

14. The method of claim 9 wherein said forwarding further comprises transmitting, from a second intermediate network edge device, a selectively modified TCP/IP acknowledge to a source host accessible on said another of said host networks.

15. An internetwork in which intermediate network lower layer flow control is extended between host networks supporting higher layer flow control, comprising:
plural host networks supporting higher layer flow control therebetween; and
at least one intermediate network interconnecting said plural host networks and supporting lower layer flow control, each of said at least one intermediate networks comprising
a first node for receiving higher layer flow control information from a first of said plural host networks,
circuitry for selectively modifying said received higher layer flow control information based on said received higher layer flow control information, previously received higher layer flow control information, and intermediate network lower layer flow control status, and
a second node for forwarding said selectively modified higher layer flow control information to a second of said plural host networks.

16. The internetwork of claim 15 wherein each of said plural host networks supports TCP/IP transport layer flow control as said higher layer flow control.

17. The internetwork of claim 15 wherein said at least one intermediate network is comprised of an Asynchronous Transfer Mode (ATM) network.

18. The internetwork of claim 17 wherein said lower layer flow control is Quantum Flow Control.

19. The internetwork of claim 15 wherein said first node is a first intermediate network edge device attached to said first host network and adapted to receive higher layer flow control information from said first host network.

20. The internetwork of claim 15 wherein said second node is a second intermediate network edge device attached to said second host network and adapted to transmit said selectively modified higher layer flow control information to said second host network.

21. The internetwork of claim 20 wherein said second intermediate network edge device further comprises said circuitry for selectively modifying said received higher layer flow control information.

22. The internetwork of claim 15 wherein said circuitry for selectively modifying said received higher layer flow control information further comprises:
a parsing unit for parsing data from said received higher layer flow control information;
first storage elements for storing said data from said received higher layer flow control information and data from previously received and parsed higher layer flow control information;
a comparison element for comparing said stored data;
second storage elements for maintaining a flow control status of said intermediate network; and
a flow control information modification assembly for selectively modifying said higher layer flow control information based upon input from said comparison element and contents of said second storage elements.

23. The internetwork of claim 15 wherein said second node is further adapted for forwarding said selectively modified higher layer flow control information to said second of said plural host networks via at least one further intermediate network.

24. The internetwork of claim 15 wherein
said circuitry for selectively modifying said received higher layer flow control information is further adapted for selectively creating generated higher layer flow control information based upon said received higher layer flow control information, previously received higher layer flow control information, and intermediate network lower layer flow control status, and
said second node is further adapted for forwarding said selectively created higher layer flow control information to said second of said plural host networks.

25. A network device operable to interface a first network, supporting a lower layer flow control protocol, to at least one second network, supporting a higher layer flow control protocol, said device comprising:
buffers for storing
higher layer flow control information originated by at least one device in said second network, and
lower layer flow control status associated with said first network responsive to said lower layer flow control protocol;
circuitry for analyzing said stored higher layer flow control information, for analyzing said lower layer flow control status, and for selectively modifying said higher layer flow control information based upon said analyses; and
a forwarding element for forwarding said selectively modified higher layer flow control information to said second network.

26. The device of claim 25 further comprising at least one network interface module for receiving said higher layer flow control information, said network interface module comprising said forwarding element.

27. The device of claim 25, further comprising plural network interface modules, a first subset of which for receiving said higher layer flow control information as distributed flow control information from said first network, and at least one of said modules partially comprising said forwarding element.

28. The method of claim 1 wherein said establishing said lower layer flow control status further comprises identifying the status of a hop by hop flow control protocol at a switch attached to said intermediate network.

29. The method of claim 28, wherein said hop by hop flow control protocol is Quantum Flow Control.

30. The method of claim 1, wherein said higher layer flow control is TCP/IP flow control.

31. The method of claim 1, wherein said higher layer flow control is a transport layer flow control.

32. The method of claim 1, wherein said lower layer flow control is a link layer flow control.

33. The method of claim 9 wherein said lower layer flow control information comprises a status of a hop by hop flow control protocol at a switch attached to said intermediate network.

34. The method of claim 33, wherein said hop by hop flow control protocol is Quantum Flow Control.

35. The method of claim 9, wherein said transport layer flow control is TCP/IP flow control.

36. The method of claim 9, wherein said lower layer flow control is a link layer flow control.

37. The method of claim 15 wherein said intermediate network lower layer flow control status comprises the status of a hop by hop flow control protocol at a switch attached to said intermediate network.

38. The method of claim 15, wherein said intermediate network lower layer flow control is a hop by hop flow control protocol.

39. The method of claim 38, wherein said hop by hop flow control protocol is Quantum Flow Control.

40. The method of claim 15, wherein said higher layer flow control is TCP/IP flow control.

41. The method of claim 15, wherein said higher layer flow control is a transport layer flow control.

42. The method of claim 15, wherein said intermediate network flow control is a link layer flow control.

43. The device of claim 25, wherein said higher layer flow control protocol is TCP/IP.

44. The device of claim 25, wherein said higher layer flow control protocol is a transport layer flow control protocol.

45. The device of claim 25, wherein said lower layer flow control protocol is a link layer flow control protocol.

46. A network device operable to interface a first network supporting a first flow control protocol to at least one second network supporting a transport layer flow control protocol, said device comprising:
   buffers for storing
      transport layer flow control information originated by at least one device in said second network, and
      first flow control protocol status associated with said first network responsive to said first flow control protocol;
   circuitry for analyzing said stored transport layer flow control information, for analyzing said first flow control protocol status, and for selectively modifying said transport layer flow control information based upon said analyses; and
   a forwarding element for forwarding said selectively modified transport layer flow control information to said at least one second network.

47. The device of claim 46, wherein said transport layer flow control protocol is TCP/IP.

48. The device of claim 46, wherein said first flow control protocol is a link layer flow control protocol.

49. A network device operable to interface a first network supporting a first flow control protocol to at least one second network supporting a second flow control protocol, said device comprising:
   buffers for storing
      second flow control protocol information originated by at least one device in said second network, and
      first flow control protocol status associated with said first network responsive to said first flow control protocol;
   circuitry for analyzing said stored second flow control protocol information, for analyzing said first flow control protocol status, and for selectively modifying said second flow control protocol information based upon said analyses; and
   a forwarding element for forwarding said selectively modified second flow control protocol information to said at least one second network.

50. The device of claim 49, wherein said second flow control protocol is TCP/IP.

51. The device of claim 49, wherein said first flow control protocol is a link layer flow control protocol.

52. The method of claim 1, wherein said lower layer flow control is an ATM layer flow control.

53. The method of claim 9, wherein said lower layer flow control is an ATM layer flow control.

54. The method of claim 15, wherein said intermediate network flow control is an ATM layer flow control.

55. The device of claim 25, wherein said lower layer flow control protocol is an ATM layer flow control protocol.

56. The device of claim 46, wherein said first flow control protocol is an ATM layer flow control protocol.

57. The device of claim 49, wherein said first flow control protocol is an ATM layer flow control protocol.

* * * * *